Dec. 7, 1954   C. W. LINCOLN ET AL   2,696,127
TRANSMISSION CONTROL
Filed Dec. 16, 1950

Inventors
Clovis W. Lincoln,
Philip B. Zeigler &
Ralph Malone
By Willits, Helwig & Baillio
Attorneys

United States Patent Office 2,696,127
Patented Dec. 7, 1954

2,696,127

TRANSMISSION CONTROL

Clovis W. Lincoln and Philip B. Zeigler, Saginaw, and Ralph A. Malone, Chesaning, Mich., assignors to General Motors Corporation, Detroit, Mich., a corporation of Delaware Application December 16, 1950, Serial No. 201,224

13 Claims. (Cl. 74—484)

This invention relates to an improved control mechanism and particularly an improved transmission control mechanism and hand lever mounting on the steering column of a motor vehicle.

The applicants' invention is illustrated in connection with a transmission control mechanism in which the transmission control or gearshift control hand lever is mounted on the steering column. The hand lever is a hollow member having a hollow ball formed on the inner end. The ball fits into a parted spherical bearing on the steering column for pivotally mounting the hand lever on the steering column. A controlled lever is mounted substantially axially within the steering column and extends through suitable apertures in the parted spherical bearing and in the ball formation on the end of the hand lever. In the center of the ball the lever has a lateral extension which extends part way into the hollow hand lever and is pivotally connected thereto at a point intermediate its length.

The primary object of the invention is to provide an improved hand control lever mounting of simplified construction suitable for low cost fabrication.

Another object of the invention is to provide an improved hand control lever mechanism in which the lever is directly mounted in a spherical bearing.

Another object of the invention is to provide a compact transmission control mechanism in which the control rod extends directly through the center of the universal pivot for the hand lever and the hollow hand lever.

Another object of the invention is to provide a simplified universal joint mounting for a steering column supported transmission control lever and a connection to the control rod that may be easily disassembled and the hand lever removed.

These and other objects of the invention and the manner in which they are achieved will be more fully apparent from the appended description of the preferred embodiment of the invention and the accompanying drawings.

Figures 1, 2, 3:
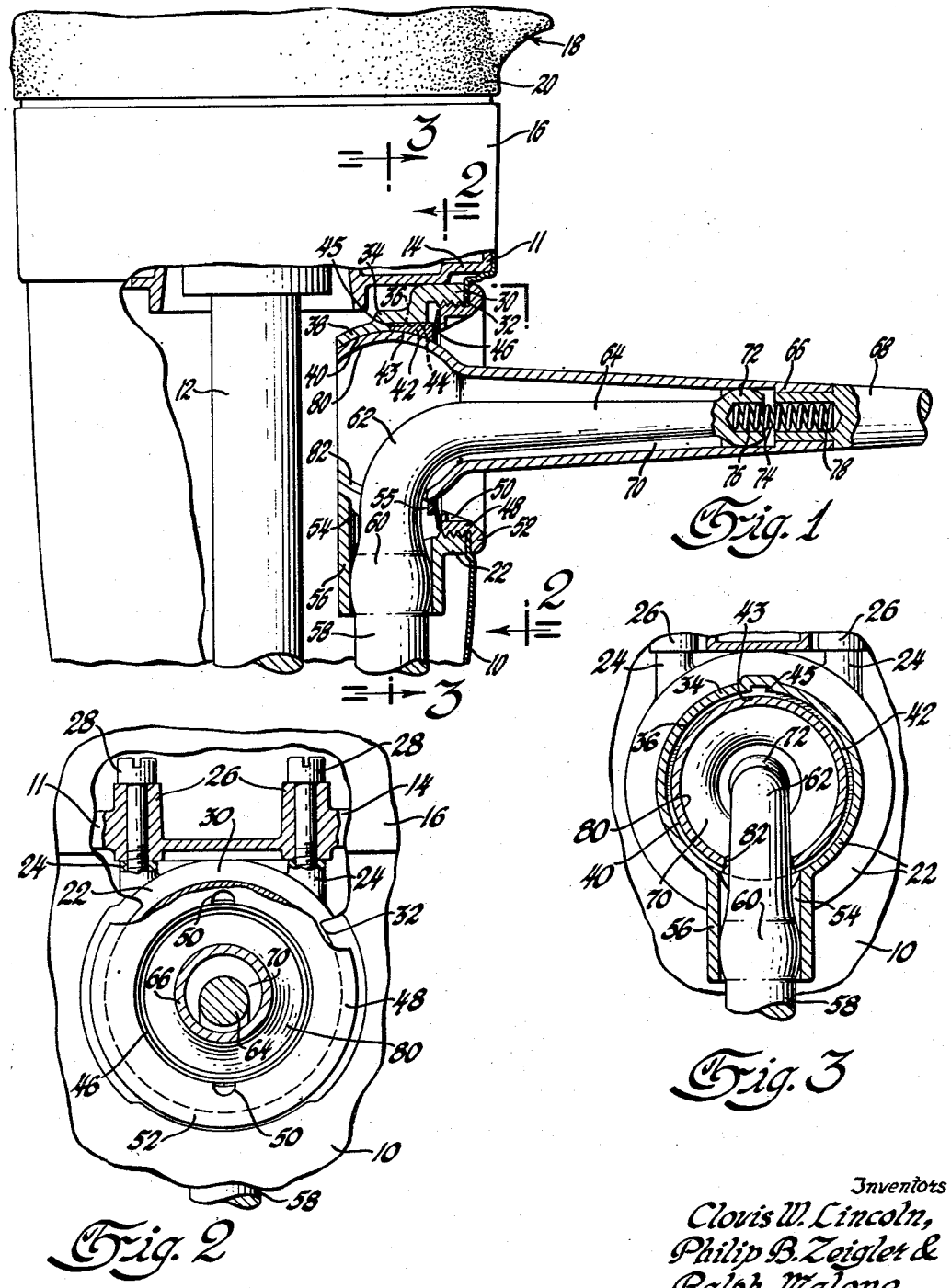
Figure 1 is a partial view of the control mechanism with parts in section to show the invention.
Figure 2 is a partial sectional view on the line 2—2 of Figure 1.
Figure 3 is a partial sectional view on the line 3—3 of Figure 1.

The invention is illustrated in connection with a transmission control mechanism mounted on the steering column of an automobile in accordance with the conventional practice. Figure 1 of the drawing illustrates the upper end of the steering column 10. The steering column 10 is capped at its upper end by a housing 11 which fits within and is secured, by suitable means (not shown), to an enlarged portion 16 of the upper end of the steering column. The steering shaft is located concentrically within the steering column 10 and is rotatably supported by a bearing (not shown) mounted on the web 14 of housing 11. The web portion 14 constitutes the lower part of housing 16 and may support a turn signal switch which may be mounted in the housing. The steering wheel 18 is located above the housing 16 and has a conventional hub 20 suitably secured to the steering shaft 12.

The gear shift control mechanism is supported from the steering column 10 by a bearing or support housing 22. As shown in Figure 2, the housing 22 has a pair of bosses 24 with threaded apertures at the upper side of the bearing housing. The web 14 of the housing 11 also has a pair of apertured bosses 26. Machine screws extend through the bosses 26 and are threaded into the bosses 24 to secure the bearing housing 22 to the housing 16 and to the steering column structure. The forward portion of the housing 22 has a generally cylindrical flange 30 engaging the inner surface of the steering column 10 at the periphery of an aperture 32 in the steering column 10. In the central portion of the housing 22 just beyond the flange 30 there is an annular reduced portion 34 which has an internal cylindrical bearing portion 36 having a smaller diameter than flange 30. The rear portion 38 of the support 22 has a semi-spherical internal bearing surface 40. A matching semi-spherical bearing block 42 has a bearing surface 43 and a cylindrical outer bearing surface 44 so that it fits within the cylindrical bearing surface 36 of the housing 22 to form a complete spherical bearing in conjunction with the bearing surface 40 on the housing 22. Rotation of the bearing block 42 may be prevented by an interfitting spline and groove 45 respectively located on the bearing block 42 and the housing 22. The semi-spherical bearing member 42 is resiliently retained in position within the cylindrical recess 36 by means of a disc or belleville spring washer 46. The spring washer 46 is retained in position by a threaded annular bushing 48, which is secured to the bearing housing 22 by threads on the inner surface of the flange 30. The threaded plug 48 has suitable recesses 50 so that internal spanner type wrench may be employed to tighten the plug in the flange 30. The plug 48 also has a radial external annular flange 52 which clamps the peripheral edge of the steering column 10 about the aperture 32 against the flange 30 of the bearing housing 22.

The lower portion of the bearing housing 22 has a suitable aperture 54 and a downwardly projecting cylindrical guide portion 56 surrounding the aperture 54. The spherical bearing member 42 has a recess 55 in the portion over aperture 54 to allow the rod 58 to extend through the bearing housing.

The control rod or tube 58 which is suitably connected to the transmission, extends through the aperture 54 and cylindrical guide 56. The rod 58 is provided with an enlargement 60 of a generally spherical contour to provide a suitable bearing surface between the rod 58 and the guide 56. The rod 58 extends upwardly into the spherical bearing and there has a bend 62 and a laterally projecting portion 64 which extends outwardly into a hollow handle 66. The hand lever or handle 66 may have a solid outer portion 68 but has a hollow inner end portion 70 so that the control rod extension may extend into the handle. The control rod extension 64 has a spherical enlargement 72 at the outer end which fits in the hollow portion 70 of the handle 66 to provide a pivotal connection between the control rod and the handle. This pivotal connection is provided with an antirattling coil spring 74 which may be seated in an aperture 76 in the end of the control rod extension 64 and an aperture 78 in the solid portion 68 of the handle.

The inner end of the hollow handle portion 70 is formed to provide a spherical or ball-like terminal portion 80. The spherical portion 80 fits within the spherical bearing formed by the semi-spherical bearing surface 40 of the support 22 and the semi-spherical bearing surface 43 of the separate bearing block 42. This spherical bearing connection between the hand lever 66 and the support member 22 provides for universal movement of the handle 66 with respect to the steering column 10. In order to provide clearance for this movement of the control rod 58 and so that the hand lever 66 may be inserted in the spherical bearing, the lower portion of the spherical terminal portion 80 of the handle 66 has a recess 82 extending from the inner end of the handle a sufficient distance to provide clearance around the control rod 58 in all positions of the handle 66.

From the above description of the structure employing the applicants' invention, it will be seen that rotary movement of the hand lever 66 in a plane substantially at right angles to the steering column will rotate the control rod 58, while reciprocating movement of the hand lever 66 axially of the steering column 10 will reciprocate the control rod 58 axially of the steering column. The control mechanism is pivotally supported in the bearing housing 22 which is secured by the machine screws 28 to the housing 14 of the steering column structure 10. It will also be appreciated that the housing 22 is supported by the clamping engagement of the end surface of the flange portion 30 and the flange 52 of the annular housing 48. It will be seen that the bearing housing 22 may be supported by either of these arrangements alone or in combination, or it could be formed as an integral portion of the housing 11 and thus eliminate these other support means. The hand lever 66 is pivotally supported by means of the spherical terminal portion 80 fitting in the semi-spherical bearing 40 formed in the inner portion 38 integral with the bearing housing 22 and a semi-spherical bearing 43 on the removable bearing block 42 which fits in an intermediate portion 34 of the housing 22. These two bearing portions are resiliently held together and contact the spherical portion 80 of the hand lever by a belleville spring 46 which is held in position by the annular plug 48. Thus the hand lever 66 is universally pivotally mounted for movement in any direction.

The control rod 58 extends parallel to the steering column and is provided at its lower end with suitable connecting linkages at the lower end of the steering column to control the transmission. The upper end of the control rod is supported in the cylindrical guide 56 which is integrally formed with the lower portion of the support housing 22. The guide 56 allows rotary and reciprocating movement of the control rod 58. The control rod extends upwardly through a slot 82 in the spherical portion 80 of the control lever 66 and bends at 62 to form a lateral extension 64. The lateral extension 64 extends into the hollow portion 70 of the hand lever 66. At the end of the extension 64 an integral rounded bearing portion 72 provides a pivotal connection between the hand lever and the extension 64. It will be seen that when the hand lever 66 is reciprocated parallel with the steering column axis 10 that the ball member 72 pivots and slides in the hollow portion 70 of the handle 66. In the event that excessive clearances may cause some of these parts to rattle, the spring 74 is inserted between the end of the extension 64 and the hand lever 66 to take up any excessive clearance.

This detailed description of the preferred embodiment of the invention is not to be considered as limiting the invention, since many modifications will occur to those skilled in the art within the scope of the invention defined in the appended claims.

We claim:

1. In a control mechanism, a support column extending axially, a bearing housing having an axially extending wall mounted on said support column, said wall having a transversely facing opening, a spherical bearing in said opening in said wall on said bearing housing, a handle having a spherical portion seated in said spherical bearing and extending transversely, said bearing housing having a guide member, a control rod extending axially through said guide member, a lateral extension on said rod extending transversely in the same direction as said handle, and pivot means between said extension and an intermediate portion of said handle.

2. In a control mechanism, a support column, a bearing housing mounted on said support column, a spherical bearing in said bearing housing, a handle having a hollow spherical portion seated in said spherical bearing, said bearing housing having an aperture, a slot in the spherical portion of said handle, a control rod extending through said aperture and said slot into the hollow spherical portion of said handle, a lateral extension on said rod extending longitudinally of said hollow handle, and pivot means between said extension and an intermediate portion of said handle.

3. In a control mechanism, a support column, a bearing housing mounted on said support column, a spherical bearing in said bearing housing, a hollow handle having a spherical portion seated in said spherical bearing, said bearing housing having an aperture, a cylindrical guide portion surrounding said aperture, a slot in the spherical portion of said handle, a control rod extending through said aperture and said slot into the hollow spherical portion of said handle, a lateral extension on said rod extending into said hollow handle, and pivot means between said extension and an intermediate portion of said handle.

4. In a control mechanism, a support column, a bearing housing mounted on said support column, a semi-spherical bearing portion on said bearing housing, a matching semi-spherical bearing member slidably mounted on said bearing housing, a handle having a spherical portion seated in said semi-spherical bearing portions, resilient means urging said bearing member toward said bearing portion to slidably engage said spherical portion, said bearing housing having a cylindrical guide portion, a control rod extending through said cylindrical guide portion, a lateral extension on said rod extending laterally proximate to said handle, and pivot means between said extension and an intermediate portion of said handle.

5. In a control mechanism, a support column, a bearing housing mounted on said support column, a semi-spherical bearing portion on said bearing housing, a matching semi-spherical bearing member slidably mounted on said bearing housing, a hollow handle having a spherical portion seated in said semi-spherical bearing portions, resilient means urging said bearing member toward said bearing portion to slidably engage said spherical portion, said bearing housing having an aperture, a cylindrical guide portion surrounding said aperture, a slot in the spherical portion of said handle, a control rod extending through said aperture and said slot into the hollow spherical portion of said handle, a lateral extension on said rod extending into said hollow handle, and pivot means between said extension and an intermediate portion of said handle.

6. In a transmission control mechanism, a steering column, a bearing housing mounted on said steering column, a two-part spherical bearing fixed to said bearing housing, a hollow handle having a spherical portion seated in said two-part spherical bearing, resilient means urging one of said two-part bearing members toward the other of said two-part bearing members to slidably engage said spherical portion, said bearing housing having an aperture, a slot in the spherical portion of said handle, a control rod extending through said aperture and said slot into the hollow spherical portion of said handle, a lateral extension on said rod extending into said hollow handle, and pivot means between said extension and an intermediate portion of said handle.

7. In a transmission control mechanism, a steering column having an aperture, a bearing housing mounted within said steering column and facing said aperture, a semi-spherical bearing portion fixed to said bearing housing, a matching semi-spherical bearing member slidably mounted on said bearing housing, a hollow handle extending through said aperture in said steering column and having a spherical portion seated in said semi-spherical bearing portions, resilient means urging said bearing member toward said bearing portion to slidably engage said spherical portion, said bearing housing having an aperture, a slot in the spherical portion of said handle, a control rod extending through said aperture in the bearing housing and said slot into the hollow spherical portion of said handle, a lateral extension on said rod extending into said hollow handle, and pivot means between said extension and an intermediate portion of said handle.

8. In a transmission control mechanism, a steering column having an aperture, a bearing housing mounted within said steering column and facing said aperture, a spherical bearing in said bearing housing, a hollow handle extending through said aperture in said steering column and having a spherical portion seated in said spherical bearing, said bearing housing having an aperture facing axially of said steering column, a slot in the spherical portion of said handle, a control rod extending through said aperture in the bearing housing and said slot into the hollow spherical portion of said handle, a lateral extension on said rod extending into said hollow handle, and pivot means between said extension and an intermediate portion of said handle.

9. In a transmission control mechanism, a steering column having an aperture in a wall, a bearing housing mounted within said steering column facing said aperture in said steering column, a two-part spherical bearing portion on said bearing housing, one part of said bearing member being slidably mounted on said bearing housing, a hollow handle extending through said aperture in said steering column and having a spherical portion seated in said two-part spherical bearing, resilient means urging said one part of said bearing toward the other part of said bearing to slidably engage said spherical portion, said bearing housing having an aperture, a slot in the spherical portion of said handle, a control rod extending through said aperture in the bearing housing and said slot into the hollow spherical portion of said handle, a lateral extension on said rod extending into said hollow handle, and pivot means between said extension and an intermediate portion of said handle.

10. In a transmission control mechanism, a steering column having an aperture, a bearing housing mounted within said steering column adjacent said aperture in said steering column, a two-part spherical bearing portion on said bearing housing, one part of said bearing member being slidably mounted on said bearing housing, a handle extending through said aperture in said steering column and having a spherical portion seated in said two-part spherical bearing, resilient means urging said one part of said bearing toward the other part of said bearing to slidably engage said spherical portion, said bearing housing having an aperture, a control rod extending within said steering column adjacent said bearing housing, a lateral extension on said rod extending through said aperture in said steering column and in the same direction as said handle, and pivot means between said extension and an intermediate portion of said handle.

11. In a transmission control mechanism, a steering column having an aperture, a bearing housing mounted within said steering column coaxial with said aperture in said steering column, a semi-spherical bearing portion fixed to said bearing housing, a matching semi-spherical bearing member slidably mounted on said bearing housing, a hollow handle extending through said aperture in said steering column and having a spherical portion seated in said semi-spherical bearing portions, resilient means urging said bearing member toward said bearing portion to slidably engage said spherical portion, annular means holding said resilient means in place and clamping the edge of said steering column about said aperture against said bearing housing, said bearing housing having an aperture, a slot in the spherical portion of said handle, a control rod extending through said aperture in the bearing housing and said slot into the hollow spherical portion of said handle, a lateral extension on said rod extending into said hollow handle, and pivot means between said extension and an intermediate portion of said handle.

12. In a control mechanism, a support column, a bearing housing mounted on said support column, a semi-spherical bearing portion fixed to said bearing housing, a matching semi-spherical bearing member slidably mounted on said bearing housing, a hollow handle having a spherical portion seated in said semi-spherical bearing portions, resilient means urging said bearing member toward said bearing portion to slidably engage said spherical portion, said bearing housing having an aperture, a slot in the spherical portion of said handle extending to the inner end of the handle, a control rod extending through said aperture and said slot into the hollow spherical portion of said handle, said slot to permit inserting the handle into said bearing after said control rod is positioned, a lateral extension on said rod extending into said hollow handle, and pivot means between said extension and an intermediate portion of said handle.

13. In a control mechanism, a support column, a bearing housing mounted on said support column, a spherical bearing in said bearing housing, a handle having a hollow spherical portion seated in said spherical bearing, said bearing housing having an aperture, a slot in the spherical portion of said handle, a control rod extending through said aperture and said slot into said hollow spherical portion and having an extension positioned longitudinally of and proximate to said handle, and pivot means between said extension and an intermediate portion of said handle.

References Cited in the file of this patent

UNITED STATES PATENTS

| Number | Name | Date |
|---|---|---|
| 2,136,697 | Lapsley | Nov. 15, 1938 |
| 2,249,173 | Rawley | July 15, 1941 |
| 2,286,773 | Wahlberg | June 16, 1942 |
| 2,334,421 | Leach | Nov. 16, 1943 |